United States Patent [19]

Schramm et al.

[11] Patent Number: 4,853,358

[45] Date of Patent: Aug. 1, 1989

[54] METHOD OF MAKING INORGANICALLY CROSSLINKED LAYERED COMPOUNDS

[75] Inventors: Charles M. Schramm, Cupertino, Calif.; Robert H. Lane, Plano, Tex.; Martin B. Dines, deceased, late of Laguna Beach, Calif., by Elaine Dines, legal representative

[73] Assignee: Occidental Research Corporation, Los Angeles, Calif.

[21] Appl. No.: 899,346

[22] Filed: Aug. 22, 1986

[51] Int. Cl.$^4$ .................... B01J 27/88; B01J 27/19; B01J 31/02
[52] U.S. Cl. .................... 502/167; 502/162; 502/168; 502/171; 502/208; 502/210; 502/211; 502/213; 502/214; 502/215; 502/258; 502/261; 502/262; 502/302; 502/304; 502/305; 502/313; 502/325; 502/329; 502/333; 502/334; 502/335; 502/336
[58] Field of Search ............... 502/162, 171, 208, 210, 502/211, 213, 214, 215, 258, 261, 262, 302, 304, 305, 313, 325, 329, 333, 334, 335, 336, 2, 527, 167, 168

[56] References Cited

U.S. PATENT DOCUMENTS

| | | | |
|---|---|---|---|
| 4,176,090 | 11/1979 | Vaughn et al. | 423/327 X |
| 4,216,188 | 8/1980 | Shabtai et al. | 423/328 UX |
| 4,271,043 | 6/1981 | Vaughn et al. | 502/500 X |
| 4,384,981 | 5/1983 | Dines et al. | 502/162 X |
| 4,386,013 | 5/1983 | Callahan et al. | 502/162 |
| 4,533,651 | 8/1985 | Masters et al. | 502/117 |
| 4,629,712 | 12/1986 | Pinnavaia et al. | 502/84 X |
| 4,650,779 | 3/1987 | Goldstein | 502/38 |
| 4,665,045 | 5/1987 | Pinnavaia et al. | 502/84 |
| 4,717,513 | 1/1988 | Lewis et al. | |

*Primary Examiner*—Patrick P. Garvin
*Assistant Examiner*—George R. Fourson
*Attorney, Agent, or Firm*—Robert J. Baran

[57] ABSTRACT

The instant invention relates to a method for converting phosphorus containing polymers from a two dimensional, layered structure into a three dimensional structure by crosslinking such layers. The method and the resulting crosslinked polymers may be used to encapsulate active materials such as catalysts, pesticides, etc. by intercalating such active materials between the layers prior to crosslinking. Thus, the egress of said active materials into the environment during use may be hindered or prevented. The crosslinked polymers, themselves, may also be used as catalysts or as selective sorbents.

11 Claims, No Drawings

METHOD OF MAKING INORGANICALLY CROSSLINKED LAYERED COMPOUNDS

BACKGROUND OF THE INVENTION

1. Field of the Invention

The instant invention relates to a method for converting phosphorus polymers from a two dimensional, layered structure into a three dimensional structure by crosslinking such layers with inorganic moieties. Preferably, the method and the resulting crosslinked polymers are used to encapsulate active materials such as catalysts, pesticides, etc. by intercalating such active materials between the layers prior to crosslinking. The active materials may also be the crosslinking agents or precursors. The egress of said active materials into the environment during use may be hindered or prevented by the crosslinked structure of products of this invention. Ingress of material from the exterior to the interior of the crosslinked polymers will be restricted by the crosslinks as well.

2. Background of the Prior Art

Methods for encapsulating an active moiety are well known in the prior art. Such methods may comprise surrounding an active moiety, such as a drug, pesticide, etc., by a polymeric material. The encapsulated product can be designed to allow the active moiety to permeate through the capsule wall into the environment of use over a period of time (slow release) or the capsule can be utilized by abrupt rupture to release the active moiety into an environment immediately. The capsule can also be used by allowing a reactant to permeate through the wall for interaction with the active moiety within the capsule and the reaction products recovered by back permeation or immobilized inside the capsule. In general, the above described encapsulated products utilize a polymeric material functioning as a membrane to isolate the active moiety from environment or control the passage of the active moiety into the environment.

It is also known that various separations can be effected with materials having pores which are designed to admit the passage therethrough of molecules of less than a certain size while prohibiting the passage of larger molecules. For example, the crystalline aluminosilicates known as zeolites have been utilized for the separation of molecules on the basis of molecular size.

A novel class of compounds has now become known, which compounds may be described as inorganic polymers. These compounds are described in U.S. Pat. Nos. 4,232,146; 4,235,990; 4,235,991; 4,256,872; 4,267,308; 4,276,409; 4,276,410; 4,276,411; 4,298,723; 4,299,943; 4,373,079; 4,384,981; 4,386,013; 4,390,690; 4,429,111; and 4,436,899 which are hereby incorporated by reference. These compounds may be prepared having a layered structure similar to the layered structure of zirconium phosphate. The above patents teach that these novel layered compounds have many uses. However, although these layered compounds may be formed with a "pillared" structure by synthesis from bifunctional acids comprising a Group V atom, it has nowhere been disclosed that such compounds may be converted from their normal two-dimensional (layered) structure into a three-dimensional structure, after synthesis, by crosslinking said layers.

U.S. Ser. No. 614,111, by Callahan et al., filed May 24, 1984, discloses crosslinking the above novel layered compounds and $Zr(O_3POH)_2$, generally with bisphosphonic acids. It has also been disclosed that monophosphonic acids may be exchanged into the above layered compounds after synthesis. However, the purpose of such exchange was to vary the pendant functional groups within the layers, not to crosslink the layers and provide a three-dimensional structure.

Finally, U.S. Pat. No. 4,386,013 teach that the method of U.S. Ser. No. 614,111 may be utilized to prepare catalysts, such as hydrogenation and hydroformylation catalysts which are resistant to leaching. Such teaching is hereby incorporated by reference to show one embodiment of the instant invention.

SUMMARY OF THE INVENTION

The instant invention provides a method of making layered compounds resistant to the egress or ingress of moieties greater than a specific size from or into the interlayer space. In one aspect, the instant invention provides a method for encapsulating an active moiety, such as, for example, a catalyst, a pesticide, etc., between the layers of certain layered compounds, and the products prepared by said method. The products can be designed so that the active moiety is utilized by release into an environment over a period of time (slow release) or abruptly released by destruction of the layered compound. Alternatively, it may be desirable (if said active moiety is a catalyst) to retain said active moiety within said capsule during use. Both the method of making the layered compounds resistant to egress or ingress of said moieties as noted above and products including an active moiety encapsulated within the layered compounds are novel. In another aspect the active moiety itself serves to crosslink the layers.

Thus, a novel method for making a product comprising an active moiety encapsulated within a layered compound comprises the steps of:

(a) intercalating an active moiety, e.g. a compound having catalytic activity, (or the precursor of an active moiety) into the layers of the layered compound, wherein said layered compound is characterized as a layered crystalline material comprising contiguous layers, each of said layers being spaced from and substantially unconnected to its neighboring layer, to thereby allow access of said active moiety into the interior of said crystalline material, and (b) crosslinking said layers with a hydroxy metal complex of e.g., aluminum, zirconium, titanium or chromium, to hinder egress of said active moiety from the interior of said crystalline material, or to form a porous, shape-selective material, or to form a catalytically active solid.

Furthermore, a novel method for making a product comprising an active moiety incorporated within a layered compound comprises the steps of:

(a) crosslinking a layered compound, characterized as a layered crystalline material comprising contiguous layers, each of said layers being spaced from and substantially unconnected to its neighboring layer, with a hydroxy metal complex of e.g., aluminum, zirconium, titanium or chromium, to form a porous, shape-selective material, or, provided said hydroxy metal complex is catalytically active, to form a catalytically active solid.

DETAILED DESCRIPTION OF THE INVENTION

1. The Layered Compound

The compounds useful in the products and method of the instant invention will be selected from the group consisting of compounds represented by the formula $M(O_3ZO_xR)_n$. In the above formula n varies from >1 to 2, more preferably from 1.1 to 2 and most preferably from 1.5 to 2, e.g. 2. M represents a tetravalent metal ion selected from the group consisting of

| Zr | Te | Pr | Mn |
|----|----|----|----|
| W  | Sn | Pb | Ir |
| U  | Si | Os | Hf |
| Ti | Ru | Nb | Ge |
| Th | Pu | Mo | Ce |

Z is an atom selected form the group consisting of the members of Group V of the Periodic Table of the Elements having an atomic weight of at least 30; R is selected from the group consisting of hydrogen and organic radicals and x varies from 0 to 1. More preferably, said compound will be selected from the group consisting of the compounds represented by the general formula $M(O_3PR)_2$ or $M(O_3POR)_2$.

The above compounds may be prepared by a process which comprises reacting, in a liquid medium, at least one acid compound, i.e. an organo-substituted, pentavalent atom containing acid, having the formula

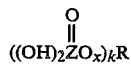

wherein k varies from 1 to <2 with at least one of the above tetravalent metal ions to precipitate a solid in which the molar ratio of pentavalent atom to tetravalent metal is approximately 2 to 1, the pentavalent atom is covalently bonded to R and when x equals 1, R is linked to the pentavalent element Z through oxygen.

It should be noted that x will be 0 when the starting material for preparing the compound is represented by the general formula

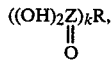

e.g.,

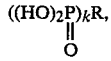

i.e., orthophosphorous acid or organophosphonic acids. When the starting material is represented by the general formula

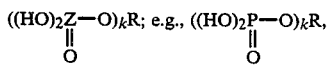

i.e., organophosphoric acids or phosphoric acid, x will be 1. If a mixture of such starting materials are used, x will vary from 0 to 1 in accordance with the ratio of the starting materials and n will vary from >1 to 2.

The tetravalent metal M and the pentavalent atom Z, may be selected in accordance with the desired properties for the active moiety by those skilled in the art. However, M is preferably Zr and Z is preferably P.

R is selected from the group consisting of hydrogen radicals, organo acyclic, alicyclic, heteroacyclic, heterocyclic, aromatic groups, and mixtures thereof. In one embodiment of this invention at least a portion of the R groups comprise a crosslinkable functional group.

R will be chosen to enable the compound to achieve a layered structure, whereby an active moiety may be intercalated within such layers. Thus, the size of the R may be important, since very bulky R groups may disrupt such layering.

In general, with phosphorus as the pentavalent atom, the organo group should occupy no more than about 24 $Å^2$ for proper spacing. This limitation is imposed by the basic crystal structure of zirconium phosphate. A spacing of 5.3 Å is known to exist between zirconium atoms in the zirconium plane of a crystal and a total area of about 24 $Å^2$ is known for the space bounded by zirconium atoms. It follows that any group anchored on each available site cannot have an area much larger than the site area and maintain the layered structure.

This limitation can be avoided through the use of a combination of larger and smaller groups, i.e., mixed components. If some of the sites are occupied by groups which have an area much less than about 24 $Å^2$ adjacent groups can be larger than 24 $Å^2$ and still maintain the layered structure of the compound.

The cross-sectional area which will be occupied by a given organo group can be estimated in advance of actual compound preparation by use of CPK space filling molecular models (Ealing Company) as follows: A model for the alkyl or aryl chain and terminal group is constructed, and it is situated on a scaled pattern of a hexagonal array with 5.3 Å site distances. The area of the group is the projection area on this plane. Some areas which have been determined by this procedure are listed in Table I.

TABLE I

| Moiety | Minimum Area ($Å^2$) | Moiety | Minimum Area ($Å^2$) |
|--------|---------------------|--------|---------------------|
| Alkyl chain | 15 | Isopropyl | 22.5 |
| Phenyl | 18 | t-Butyl | 25 |
| Carboxyl | 15 | Chloromethyl | 14 |
| Sulfonate | 24 | Bromoethyl | 17 |
| Nitrile | 9 | Diphenyl-phosphino | 50 (approx.) |
| Morpholinomethyl | 21 | Mecaptoethyl | 13.5 |
| Trimethylamino | 25 | | |

Note that the bulk of the above described moieties must also be included when calculating the correct R group size for attaining the preferred layered structure in the support.

Preferably a portion or all of R is hydrogen, i.e. the inorganic $Zr(O_3POH)_2$ is the preferred layered compound for use in the methods and compositions of this invention. This preferred compound, being inorganic, when reacted with the crosslinking agents described herein provide a fully inorganic, crosslinked structure.

At least a portion of the R groups will comprise a crosslinkable, functional group suitable for reaction with the crosslinking agent to convert the two-dimensional, layered structure into a three-dimensional structure. Suitable crosslinkable functional groups suitable for reaction are given in Table II, below.

TABLE II

| Functional Group | |
|---|---|
| Hydroxyl | (either as R-OH or P—OH) |
| amino | |
| carboxylic acid | |
| epoxide | |
| sulfonyl | |

Other crosslinkable functional groups are known in the polymer arts and need not be discussed further herein.

The functional group is preferably a terminal group for ease of reaction with the polyfunctional crosslinking agent and, for efficient crosslinking, the molecular size of the polyfunctional crosslinking agent is at least sufficient to bridge the interlayer space between functional groups pendant from adjacent layers.

The preferred functional groups are selected from the group consisting of carboxylic and hydroxyl groups. The crosslinking agents useful in the compositions and methods of the instant invention are disclosed in U.S. Pat. Nos. 4,216,188 and 4,176,090 which are hereby incorporated by reference. These crosslinking agents are hydroxy metal complexes of aluminum, zirconium, titanium or chromium. Other hydroxy metal complexes may also be utilized, e.g., zinc, uranium, thorium, antimony, etc. These crosslinking agents are highly charged cationic complexes containing several metal ions, i.e. using the aluminum-containing oligomer as an example, the crosslinking agents are represented by the general formula:

$$(M)_a(OH)_b(H_2O)_c^{+d}$$

wherein M is the metal, a, b and c are integers and d represents the charge on the complex. Preferably, the crosslinking agent is $[Al_{13}O_4(OH)_{24}(H_2O)_{12}]^{7+}$.

2. The Active Moiety

The active moiety may be selected from the compounds that are desirably released into the environment over a period of time (slow release) or abruptly (by rupture or other rapid disintegration of the physical integrity of the layered compound), or compounds that are desirably retained in an encapsulated state during use. Examples of moieties which are desirably released slowly into the environment include fertilizers, e.g. nitrogen, phosphorus, and potassium compounds such as urea, ureaformaldehyde derivatives, etc.; micronutrients for plants and animals such as vitamins; pharmaceuticals, such as antibiotics, antihistamines, antipyretics, etc.; pesticides, such as insecticides, e.g. methylparathion, diazinon, endosulfan, etc.; herbicides, e.g. propanil, atrazine, propachlor, etc.; rodenticides, e.g. zinc phosphide, thallium sulfate, etc.; fungicides and nematocides e.g. dichloropropene, 1,2-dibromoethane, methylisothiocyanate, etc.; perfumes, including insect attractants such as (Z)-7-dodecen-1-ol acetate, (Z)-7,8-epoxy-2-methyl octadecane, etc.; stabilizers; etc. Examples of active moieties which are desirably abruptly released into the environment by controlled disintegration of the layered compound include coreactants which must be mixed just prior to use, e.g. epoxy adhesives, solvent activated adhesives, dyes, flavors, etc. (These and other coreactive systems are illustrated in U.S. Pat. No. 4,098,736, herein incorporated by reference.)

Examples of active moieties which are desirably encapsulated during use include catalysts for various chemical reactions, including both heterogeneous and homogeneous catalysts. For example catalysts used in hydrocarbon conversions and other chemical reactions such as hydrogenation, dehydrogenation, oxidation, cyclization, isomerization, polymerization, cracking, alkylation, etc, as known in the art, are conveniently utilized as the active moiety. Examples of such catalysts include transition metal complexes, e.g. alkenyl, carbonyl, nitrilo, halide, and phosphino complexes of palladium, aluminum, titanium, cobalt, rhodium, molybdenum, iridium, platinum, iron, ruthenium etc., which are used in, e.g. the synthesis of vinyl acetate from ethylene, hydrocarbonylation of alkenes, carbonylation of methanol, syntheses of polyhydric alcohols from CO and $H_2$, stereospecific polymerization of α-olefins; oxidation catalysts such as copper, platinum, vanadium, etc, which are used in the oxidation of $NH_3$, CO and $SO_2$ etc.; mixed metal oxide catalysts, e.g. the combination of a transition metal oxide, e.g. $MoO_3$, $Fe_2O_3$, etc, and an oxide of a Group Va element, e.g. $Sb_2O_5$ and $Bi_2O_3$, which may be used for the ammoxidation of propylene; copper chloride utilized as a catalyst for the oxychlorination of ethylene; Fischer-Tropsch catalysts such as iron, ruthenium, rhodium, osmium, rhenium, etc.; methanation catalysts, e.g. ruthenium, nickel, cobalt, iron, etc.; and acidic or basic materials, such as silica-alumina, silica-magnesia, and other such metal oxides and hydroxides.

The only limitation on the active moiety that may be encapsulated by the method of the instant invention is one of size. That is, the molecular dimensions of the active moiety must be suitable for intercalation between the layers of the layers of the layered compounds. The available interlayer spacing has been discussed above. In general, at least one dimension of the active moiety should not exceed 24 Å.

3. Preparation of a Crosslinked Three-Dimensional Structure

The preparation of the crosslinked, three-dimensional structures of the instant invention may be illustrated by the preparation of a hydrocracking catalyst. However, this method is applicable to the preparation of three-dimensional, crosslinked structures comprising any of the above active moieties and to three dimensional, crosslinked structures that do not include an active moiety. (The crosslinked layered compounds prepared according to the method of this invention, like the zeolites, disclosed in the prior art, are useful for the separation of molecules according to size and may by themselves provide catalytically active sites.)

The above layered compound may be contacted with a solution comprising the active hydrocracking moiety or its precursor for a time sufficient to enable such hydrocracking moiety or precursor to intercalate into the layers of such support compound. The solvent for dissolving said hydrocracking moiety or precursor may be aqueous or nonaqueous, since in general the layered compound is stable to both types of solvents. The layered compounds are unstable in the presence of aqueous alkali; therefore, solutions having a pH of at most 8 should be utilized for preparing the hydrocracking catalyst.

The intercalated layered compound may be separated from said active hydrocracking moiety containing solution by filtration and excess solvent removed by drying at a temperature of from about 25° to about 200° C. for a time sufficient to remove substantially all of said excess solvent. Drying may take place in air or an inert atmosphere or under vacuum. The layers are then crosslinked to thereby connect contiguous layers and provide a three-dimensional structure sufficient to hinder egress of said active hydrocracking moiety from the interior of the layered compound.

The crosslinking may be carried out by contacting the intercalated compound with the crosslinking agent adapted to react and form a covalent or electrostatic bond with a functional group of the pendant R group.

Alternatively, the layered compound may be interclated with a "fugitive guest" compound to separate the layers, and then crosslinked as above. The "fugitive guest" is a compound tht will intercalate into, and separate the layers of the layered compound. This "fugitive guest" will enable a larger active moiety to intercalate the layered compound due to the now separated layers. The guest may then be removed and replaced by the active moiety. Conveniently, the above steps may be effected at ambient temperature and pressure.

Preferably, the crosslinking agent is selected from the group consisting of hydroxy complexes of aluminum, e.g. $[Al_{13}O_4(OH)_{24}(H_2O)_{12}]^{7+}$. As shown below, this invention also provides a method for preparing substantially-pure solutions of this complex, i.e. with reduced amount of aluminum complexes having a lower molecular weight.

The ratio of the polyfunctional crosslinking agent to the pendant functional groups may be selected to provide a highly or lightly crosslinked structure. The desired degree of crosslinking will depend on the intended use of the crosslinked layered compound and may be determined by simple testing.

The following are specific examples of the instant invention. There is no intention that the scope of the instant invention be limited to the examples, since there are many variations thereon which are within the ordinary skill of the art.

EXAMPLE 1

A solution of $[Al_{13}O_4(OH)_{24}(H_2O)_{12}]^{7+}$ containing $Al(H_2O)_6^{3+}$ and related species, as shown by $^{27}Al$ NMR spectroscopy, was reacted with the n-hexylamine intercalate of zirconium phosphate and stirred at room temperature for 1 hr. After filtration of the solid, the $^{27}Al$ NMR spectrum of the solution showed that monomeric octahedral aluminum species were absent. Integration of this spectrum, measured at 80° C., showed an octahedral:tetrahedral Al ratio consistent with literature data for the $Al_{13}$ cluster.

When this purified solution of the aluminum cluster was reacted with fresh n-hexylamine interclate of α-zirconium phosphate for 3 hr. at reflux, then overnight at room temperature, the $Al_{13}$ cluster was absorbed by the solid, as judged by the $^{27}Al$ NMR spectrum of the isolated solid that showed peaks characteristic of tetrahedral and octahedral aluminum, and by the spectrum of the filtrate that shows it to be devoid of $Al_{13}$ cluster. The solid contained 7.79% Al and had a d-spacing of 11.30 Å.

This material after drying may be used as a solid acid catalyst, like zeolites, for the isomerization, alkylation and condensation of hydrocarbons and other organic reactants.

While particular embodiments of the invention have been described it will be understood of course that the invention is not limited thereto since many obvious modifications can be made and it is intended to include within this invention any such modifications as will fall within the scope of the appended claims.

What is claimed is:

1. A process for preparing a catalyst composition comprising a moiety having catalytic activity intercalated between the layers of a layered crystalline material, said catalyst being characterized as resistant to egress of said moiety from between said layers, which process comprises the steps of:
   (a) intercalating a moiety having catalytic activity into the layers of a compound selected from the group consisting of compounds represented by the general formula:

$M(O_3ZO_xR)_n$ wherein M is a tetravalent metal selected from the group consisting of Zr, W, U, Ti, Th, Te, Sn, Si, Ru, Pu, Pr, Pb, Os, Nb, Mo, Mn, Ir, Hf, Ge, Ce and mixtures thereof; Z is a pentavalent atom selected from the group consisting of members of Group V of the Periodic Table of the Elements having an atomic weight of at least 30; x varies from 0 to 1; R is a radical selected from the group consisting of hydrogen and organo radicals wherein at least a portion of said R radicals comprise a crosslinkable functional group selected from the group consisting of hydroxyl, amino, carboxylic acid, epoxide and sulfonyl groups; and n varies from >1 to 2; said compound being characterized as a layered crystalline material comprising contiguous layers, each of said layers being spaced from and substantially unconnected to its neighboring layer to thereby allow access of said moiety into the interior of said crystalline material, and
   (b) crosslinking said layers to thereby connect said contiguous layers to neighboring layers and hinder egress of said moiety from the interior of said crystalline material, by reacting said compound with a hydroxy metal complex of aluminum, zirconium, titanium, chromium, zinc, uranium, thorium, antimony or mixtures thereof.

2. The process of claim 1 which comprises crosslinking said layers by reacting said compound with a hydroxy metal complex of aluminum.

3. The process of claim 2 wherein said complex has the general formula:

$[Al_{13}O_4(OH)_{24}(H_2O)_{12}]^{7+}$

4. The process of claim 1 wherein Z is P and x is 1.

5. The process of claim 1 wherein said moiety comprises a Group VIII metal or Group VIII metal compound.

6. The process of claim 5 wherein said Group VIII metal is selected from the group consisting of Pt, Rh, Ru, Pd, Ir and mixtures thereof.

7. The process of claim 1 wherein n varies from 1.5 to 2.

8. The process of claim 2 wherein said compound is $Zr(O_3POH)_2$.

9. The process of claim 3 wherein said compound is $Zr(O_3POH)_2$.

10. A catalyst composition produced by the method of claim 1.

11. A catalyst composition produced by the method of claim 2.

* * * * *